United States Patent
Hur et al.

(10) Patent No.: US 10,066,055 B2
(45) Date of Patent: Sep. 4, 2018

(54) CONTAINER FOR PRECISION MEMBER AND METHOD FOR PREPARING THE SAME

(71) Applicant: Lotte Advanced Materials Co., Ltd., Yeosu-si (KR)

(72) Inventors: Jong Chan Hur, Uiwang-si (KR); Jun Ho Chi, Uiwang-si (KR); Woo Suk Chei, Uiwang-si (KR); Eun Byul Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 749 days.

(21) Appl. No.: 14/499,552

(22) Filed: Sep. 29, 2014

(65) Prior Publication Data

US 2015/0093531 A1    Apr. 2, 2015

(30) Foreign Application Priority Data

Oct. 1, 2013    (KR) .................. 10-2013-0117403

(51) Int. Cl.
*C08G 64/06* (2006.01)
*C08G 64/30* (2006.01)

(52) U.S. Cl.
CPC ........... *C08G 64/06* (2013.01); *C08G 64/307* (2013.01); *Y10T 428/1397* (2015.01)

(58) Field of Classification Search
CPC .............................. C08G 64/06; C08G 64/307
USPC ....................................................... 428/36.92
See application file for complete search history.

(56) References Cited

U.S. PATENT DOCUMENTS

| | | | |
|---|---|---|---|
| 6,316,575 B1 | 11/2001 | Kuze et al. | |
| 6,504,002 B1 | 1/2003 | Karlik et al. | |
| 7,279,544 B2 | 10/2007 | Hucks et al. | |
| 8,263,729 B2 | 9/2012 | Carretero et al. | |
| 2012/0059099 A1* | 3/2012 | Monden | C08L 69/00 524/161 |

FOREIGN PATENT DOCUMENTS

| | | |
|---|---|---|
| CN | 1286710 A | 3/2001 |
| CN | 1620473 A | 5/2005 |
| CN | 1890290 A | 1/2007 |
| CN | 1972982 A | 5/2007 |
| CN | 103270083 A | 8/2013 |
| JP | 3966935 A | 8/1998 |
| JP | 10-292050 A | 11/1998 |
| JP | 3995346 A | 2/2000 |
| JP | 3785180 A | 3/2005 |
| JP | 2007-012793 A | 1/2007 |
| JP | 4356828 B2 | 11/2009 |
| KR | 10-2000-0022201 A | 4/2000 |
| KR | 10-1301605 B1 | 8/2013 |

OTHER PUBLICATIONS

Office Action in counterpart Korean Application No. 10-2013-0117403 dated Feb. 27, 2016, pp. 1-5.
Office Action in counterpart Chinese Application No. 201410523206.2 dated Jul. 15, 2016, pp. 1-7.
Office Action in counterpart Korean Application No. 10-2013-0117403 dated Aug. 17, 2015, pp. 1-4.

* cited by examiner

*Primary Examiner* — Edward J Cain
(74) *Attorney, Agent, or Firm* — Additon, Higgins & Pendleton, P.A.

(57) ABSTRACT

A container for precision members is prepared from a polycarbonate resin, wherein a polycarbonate resin solution prepared by immersing the polycarbonate resin in water and leaving the solution has chloride ions ($Cl^-$), fluoride ions ($F^-$) and sulfate ions ($SO_4^{2-}$) in a concentration of about 2 ppb or less, independently of each other, as detected by ion chromatography (IC). The container for precision members is capable of preserving and transporting the precision members predisposed to damage by minor amounts of impurities or contaminants without damage.

19 Claims, No Drawings

CONTAINER FOR PRECISION MEMBER AND METHOD FOR PREPARING THE SAME

CROSS-REFERENCE TO RELATED APPLICATION

This application claims priority under 35 USC Section 119 to and the benefit of Korean Patent Application No. 10-2013-0117403, filed Oct. 1, 2013, the entire disclosure of which is incorporated herein by reference.

FIELD OF THE INVENTION

The present invention relates to a container for precision members and a method for preparing the same. More particularly, the present invention relates to a container for precision members for preserving and transporting the precision members predisposed to damage by minor amounts of impurities or contaminants with minimal or no damage, and a method for preparing the same.

BACKGROUND

Aromatic polycarbonate resins have excellent mechanical properties such as impact resistance, heat resistance, transparency, and the like, and are employed in various applications. Particularly, containers made of polycarbonate resins have been widely used because they have excellent impact resistance and are transparent or translucent, which allows their contents to be visible from the outside. Further, these containers have been used in the field of precision members such as electric/electronic components or devices requiring strict isolation from contamination.

However, in the case of containers made of a typical polycarbonate resin, specifically, a polycarbonate resin prepared through interfacial polymerization, it is found that chlorine ions can be volatilized from the containers, thereby causing damage to semiconductor materials such as IC chips or precision members (products) such as silicon wafers and the like.

For example, conventional containers for precision members (Front Opening Shipping Box (FOSB) and the like) are made of interfacial polymerized polycarbonate resins prepared from a material including chlorine, such as phosgene and the like. Thus, various studies have been made to develop a method for minimizing the amount of chlorine in the interfacial polymerized polycarbonate resin, or a method for inhibiting volatilization from products (Japanese Patent Nos. 3785180, 3966935, 3995346, 4356828, and the like).

However, there are limitations to methods for minimizing the amount of chlorine in the interfacial polymerized polycarbonate resins. The preparation of containers employing resins in which the amount of chlorine is minimized is considered uneconomical. Moreover, it is found that precision members can be damaged by fluoride ions ($F^-$), sulfate ions ($SO_4^{2-}$), and gases volatilized at 150° C. or higher.

Therefore, there is a need for an economical container for precision members having minimized amounts of volatile gases while maintaining physical properties such as transparency, impact resistance and the like, as compared with existing containers for precision members.

SUMMARY

The present invention can provide an economical container for precision members for preserving and transporting the precision members predisposed to damage by minor amounts of impurities or contaminants with minimal or no damage, and a method for preparing the same.

The container for precision members is prepared from a polycarbonate resin, wherein a polycarbonate resin solution prepared by immersing the polycarbonate resin in water and leaving the solution has chloride ions ($Cl^-$), fluoride ions ($F^-$) and sulfate ions ($SO_4^{2-}$) in a concentration of about 2 ppb or less, independently of each other, as detected by ion chromatography (IC).

In one embodiment, when heated, the polycarbonate resin generates gases, wherein the gases may provide 25 or fewer detected peaks as detected by head space-solid phase microextraction for gas chromatography/mass spectrometry (hereinafter referred to as "HS-SPME GC/MS").

In one embodiment, the polycarbonate resin may be prepared by melt polymerization of an aromatic dihydroxy compound and a diaryl carbonate.

In one embodiment, the aromatic dihydroxy compound may be represented by Formula 1:

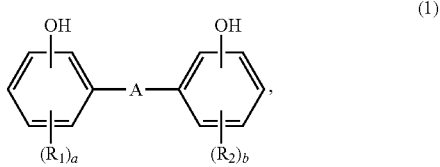

wherein A is a single bond, a substituted or unsubstituted $C_1$ to $C_{30}$ hydrocarbon group, —CO—, —S—, or —$SO_2$—; $R_1$ and $R_2$ are the same or different and are each independently substituted or unsubstituted $C_1$ to $C_{30}$ alkyl or substituted or unsubstituted $C_6$ to $C_{30}$ aryl; and a and b are the same or different and are each independently an integer ranging from 0 to 4.

In one embodiment, the diaryl carbonate may be represented by Formula 2:

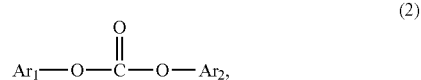

wherein $Ar_1$ and $Ar_2$ are the same or different and are each independently substituted or unsubstituted $C_6$ to $C_{20}$ aryl.

In one embodiment, a mole ratio of the aromatic dihydroxy compound to the diaryl carbonate (aromatic dihydroxy compound : diaryl carbonate) may range from about 1: about 0.9 to about 1: about 1.3.

In one embodiment, the polycarbonate resin may have a weight average molecular weight (Mw) from about 20,000 g/mol to about 35,000 g/mol.

In one embodiment, the polycarbonate resin may have a notched Izod impact strength from about 60 kgf·cm/cm to about 100 kgf·cm/cm, as measured on an about ⅛" thick specimen in accordance with ASTM D256.

In one embodiment, the polycarbonate resin may have a melt flow index (melt flow rate, MI) from about 5 g/10 minutes to about 80 g/10 minutes as measured at about 300° C. under a load of about 1.2 kg in accordance with ASTM D1238.

A method for preparing the container for precision members is also provided. The method for preparing the container includes: preparing a polymerized material through melt polymerization of an aromatic dihydroxy compound and a diaryl carbonate; preparing a pelletized extrudate by extruding the polymerized material using an extruder; and molding the pelletized extrudate to form a container for precision members.

In one embodiment, the extruder may be provided at one end thereof with a vent to perform ventilation during extrusion.

In one embodiment, the melt polymerization may include polymerizing the aromatic dihydroxy compound and the diaryl carbonate to prepare a polycarbonate prepolymer; and melt polymerizing the prepared prepolymer.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The container for precision members according to the present invention is capable of preserving and transporting precision members with minimal or no damage. The shape of the container for precision members is not particularly limited, and thus may have various shapes, such as a box shape, a cylinder shape, a typical Front Opening Shipping Box (FOSB) shape, and the like.

According to the present invention, the container for precision members is formed of a polycarbonate resin, wherein a polycarbonate resin solution, which is prepared by adding about 35 g of a polycarbonate resin to about 50 g of water, followed by leaving the resulting solution at about 50° C. for about 12 hours, and shaking at room temperature for 12 hours, has chloride ions (Cl⁻), fluoride ions (F⁻) and sulfate ions ($SO_4^{2-}$) in a concentration of about 2 ppb or less, for example, from about 0.2 ppb to about 1.8 ppb, as detected by ion chromatography (migration test). If the detected amount of the chloride ions (Cl⁻), fluoride ions (F⁻) and sulfate ions ($SO_4^{2-}$) is greater than about 2 ppb, respectively, each ion can be volatilized, thereby causing contamination and damage to precision members.

The polycarbonate resin may be prepared by melt polymerization of an aromatic dihydroxy compound and a diaryl carbonate.

As the aromatic dihydroxy compound, aromatic dihydroxy compounds typically used in preparation of polycarbonates may be employed. For example, a compound represented by Formula 1 may be utilized:

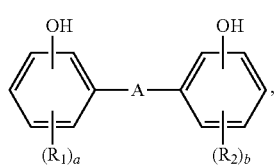

(1)

wherein A is a single bond, a substituted or unsubstituted $C_1$ to $C_{30}$ hydrocarbon group, —CO—, —S—, or —SO₂—; $R_1$ and $R_2$ are the same or different and are each independently substituted or unsubstituted $C_1$ to $C_{30}$ alkyl or substituted or unsubstituted $C_6$ to $C_{30}$ aryl; and a and b are the same or different and are each independently an integer ranging from 0 to 4.

As used herein, the term "hydrocarbon group" refers to a $C_1$ to $C_{30}$ linear, $C_3$ to $C_{30}$ branched and/or $C_3$ to $C_{30}$ cyclic saturated or unsaturated hydrocarbon group, unless otherwise specified. The term "alkyl" refers to $C_1$ to $C_{30}$ linear, branched and/or cyclic alkyl, unless otherwise specified. The term "substituted" means that one or more hydrogen atoms are replaced by a substituent. Examples of the substituent can include without limitation halogen, $C_1$ to $C_{30}$ alkyl, $C_1$ to $C_{30}$ haloalkyl, $C_6$ to $C_{30}$ aryl, $C_2$ to $C_{30}$ heteroaryl, $C_1$ to $C_{20}$ alkoxy, and the like, and combinations thereof. As used herein, the term "hetero" refers to one or more of N, O, S, and/or P atoms, in place of a carbon atom.

In one embodiment, A may be a single bond, substituted or unsubstituted $C_1$ to $C_{30}$ alkylene, substituted or unsubstituted $C_2$ to $C_5$ alkenylene, substituted or unsubstituted $C_2$ to $C_5$ alkylidene, substituted or unsubstituted $C_5$ to $C_6$ cycloalkylene, substituted or unsubstituted $C_5$ to $C_6$ cycloalkenylene, substituted or unsubstituted $C_5$ to $C_{10}$ cycloalkylidene, substituted or unsubstituted $C_6$ to $C_{30}$ arylene, substituted or unsubstituted $C_1$ to $C_{20}$ alkoxylene, a halogen acid ester group, a carbonate ester group, —CO—, —S—, or —SO₂—; and $R_1$ and $R_2$ are the same or different and are each independently substituted or unsubstituted $C_1$ to $C_{30}$ alkyl, for example $C_1$ to $C_{10}$ alkyl, or substituted or unsubstituted $C_6$ to $C_{30}$ aryl, for example $C_6$ to $C_{10}$ aryl.

Examples of the aromatic dihydroxy compound may include without limitation 2,2-bis(4-hydroxyphenyl)propane, 4,4'-biphenol, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and combinations thereof In exemplary embodiments, 2,2-bis(4-hydroxyphenyl)propane can be used.

As the diaryl carbonate, diaryl carbonate typically used in preparation of polycarbonates may be employed. For example, a compound represented by Formula 2 may be utilized:

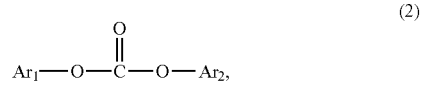

(2)

wherein $Ar_1$ and $Ar_2$ are the same or different and are each independently substituted or unsubstituted $C_6$ to $C_{20}$ aryl, for example $C_6$ to $C_{10}$ aryl.

Examples of the diaryl carbonate may include without limitation diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dipropyl carbonate, dibutyl carbonate, methylethyl carbonate, methylpropyl carbonate, ethylpropyl carbonate, dicyclohexyl carbonate, and the like, and combinations thereof In exemplary embodiments, diphenyl carbonate can be used.

In one embodiment, the mole ratio of the aromatic dihydroxy compound to the diaryl carbonate (aromatic dihydroxy compound:diaryl carbonate) is about 1:about 0.9 to about 1:about 1.3, for example, about 1:about 0.95 to about 1:about 1.25. Within this range, it is possible to reduce the amount of unreacted monomers while optimizing reactivity due to the amount of the terminal structure.

In one embodiment, the polycarbonate resin may be prepared by typical melt polymerization. For example, the polycarbonate resin may be prepared by polymerizing an aromatic dihydroxy compound and a diaryl carbonate to prepare a polycarbonate prepolymer; and melt polymerizing the prepolymer. The prepolymer refers to a polymer having a molecular weight lower than that of the final polymer during the multistep polymerization procedure. For example, the prepolymer may have a weight average molecular weight from about 2,000 g/mol to about 15,000 g/mol.

The preparation of the prepolymer may be performed after mixing the aromatic dihydroxy compound with the diaryl carbonate through a typical mixing process. For example, the mixing process may be performed at about 140° C. to about 250° C., for example, at about 160° C. to about 240° C., for about 1 hour to about 10 hours.

Polymerization may be performed at about 160° C. to about 300° C., for example, about 200° C. to about 300° C., and as another example about 240° C. to about 290° C., under a pressure of about 0.1 Torr to about 100 Torr, for example, about 0.3 Torr to about 50 Torr, for about 1 hour to about 10 hours. Further, the polymerization may be performed by dividing the polymerization into two or more stages. Within this range, it is possible to prepare a polycarbonate prepolymer having a weight average molecular weight of about 2,000 g/mol to about 15,000 g/mol.

The melt polymerization may be performed at about 240° C. to about 300° C., for example, at about 250° C. to about 290° C., under a pressure of about 0.1 Torr to about 5 Torr, for example about 0.3 Torr to about 2 Torr, for about 1 hour to about 10 hours, without being limited thereto.

In one embodiment, the polymerization and melt polymerization may be performed in the presence of a catalyst. As the catalyst, any catalyst typically used in melt polymerization of the polycarbonate resin may be utilized. Examples of the catalyst may include without limitation alkali metal catalysts, alkaline earth metal catalysts and the like, and combinations thereof Examples of the alkali metal catalyst may include LiOH, NaOH, KOH, and the like, without being limited thereto. These may be used alone or in combination thereof The catalyst may be used in an amount of about $1 \times 10^{-7}$ parts by weight to about $1 \times 10^{-4}$ parts by weight, based on about 100 parts by weight of the aromatic dihydroxy compound and the diaryl carbonate, without being limited thereto.

In one embodiment, when about 4 g of the polycarbonate resin sample is heated at 150° C. for about 30 minutes, the polycarbonate resin generates gases, wherein the gases may provide about 25 or fewer detected peaks, for example, about 15 to about 25 detected peaks, and have a detected area (total peak area) of about $3.5 \times 10^7$ Area/g or less, for example, from about $3 \times 10^6$ Area/g to about $3.4 \times 10^7$ Area/g, as detected by HS-SPME GC/MS. Within this range, it is possible to prepare a container for precision members capable of preventing the precision members from contamination by gases which are volatile at high temperature.

In one embodiment, the polycarbonate resin may have a weight average molecular weight (Mw) from about 20,000 g/mol to about 35,000 g/mol, as determined by gel permeation chromatography (GPC). Within this range, it is possible to prepare a container for precision members.

The polycarbonate resin may have a notched Izod impact strength from about 60 kgf·cm/cm to about 100 kgf·cm/cm, for example, from about 75 kgf·cm/cm to about 90 kgf·cm/cm, as measured on an about 1/8" thick specimen in accordance with ASTM D256. Within this range, it is possible to prepare a container for precision members having excellent impact resistance.

Furthermore, the polycarbonate resin may have a melt flow index from about 5 g/10 minutes to about 80 g/10 minutes, for example, from about 8 g/10 minutes to about 30 g/10 minutes, as measured at about 300° C. under a load of about 1.2 kg in accordance with ASTM D1238. Within this range, it is possible to prepare a container for precision members.

In one embodiment, the polycarbonate resin may be prepared in pellet form through melt extrusion of the resin in an extruder. The extruder may be provided at one end thereof with a vent to perform ventilation during extrusion. Upon ventilation, it is possible to further reduce the amount of chloride ions ($Cl^-$), fluoride ions ($F^-$) and sulfate ions ($SO_4^{2-}$) and detected peak number of out-gas and detected area (total peak area).

The container for precision members according to the present invention may be prepared by, for example, preparing a polymerized material through melt polymerization of an aromatic dihydroxy compound and a diaryl carbonate; preparing a pelletized extrudate by extruding the polymerized material using an extruder; and molding the pelletized extrudate to form a container for precision members.

The molding may be performed by injection molding and the like. For example, injection molding may be performed at about 300° C. to about 320° C.

These preparation methods are well known to those skilled in the art.

Hereinafter, the present invention will be described in more detail with reference to the following examples. However, it should be understood that these examples are provided for illustration only and are not to be construed in any way as limiting the present invention. A description of details apparent to those skilled in the art will be omitted herein.

EXAMPLES

Example 1

To a mixing bath, 180 kg of 2,2-bis(4-hydroxyphenyl) propane) ("bisphenol A"), 202.7 kg of diphenyl carbonate (DPC), and 100 ppb (/BPA, weight) of a catalyst (KOH) are added in order, and then oxygen is removed from the reactor using nitrogen. After melting the materials by heating the reactor to 160° C., the temperature of the reactor is raised up and then kept for 6 hours. Next, the mixture is continuously transported to a first reaction bath, which in turn is then warmed to 220° C. Then, the mixture is continuously transported to a second reaction bath for 1 hour. Then, the mixture is continuously transported to a third reaction bath to prepare a prepolymer. Next, the prepolymer is continuously transported to a fourth reaction bath and then subjected to melt polymerization. The final polymerized material is passed through an extruder to prepare polycarbonate resin pellets (yield: 99%, weight average molecular weight: 25,000 g/mol).

Example 2

A polycarbonate resin is prepared in the same manner as in Example 1 except that ventilation is performed through one end of the extruder upon extrusion (yield: 99%, weight average molecular weight: 25,000 g/mol).

Comparative Example 1

A polycarbonate resin prepared by interfacial polymerization (TEIJIN, trade name: L-1250WP, weight average molecular weight: 25,000 g/mol) is used.

Evaluation of Properties (1) Measurement of detected amount of chloride ions ($Cl^-$), fluoride ions ($F^-$) and sulfate ions ($SO_4^{2-}$): 35 g of a polycarbonate resin sample is added to 50 g of water and left at 50° C. for 12 hours, followed by shaking at room temperature for 12 hours to prepare a solution, which in turn is subjected to ion chromatography (IC).

Instruments: Ion Chromatography (model: IC 5000, maker: DIONEX)
Column: IonPac AS19 (with Guard AG19)
Eluent: potassium hydroxide
  1.0 mM from 0 to 5 min
  10 mM from 5 min to 15 min
  35 mM from 15 min to 28 min
  10 mM from 28 min to 33 min
Eluent source: EGC KOH cartridge
Flow rate 1.0 mL/min
Injection volume: 1,000 μL
Detection: conductivity detector (range: 5 μS, volt: 1V)
Suppressor: ASRS ultra II, 4 mm
Oven temp.: 30° C.

(2) Evaluation of out-gas: Gases generated by heating 4 g of a polycarbonate resin sample at 150° C. for 30 minutes are subjected to head space-solid phase microextraction gas chromatography/mass spectrometry (HS-SPME GC/MS) to measure peak number of out-gases and detected areas (total peak areas).

Instruments:
  GC: GC-6890N
  Head space sampler: Agilent G1888
  Column: carbowax 20M (ID: 0.32 mm, L: 25 m, film thickness: 0.30 μm)
  Carrier gas: He
  Pressure: 7.8 psi
  Flow rate: 2.0 ml/min (average velocity=32 cm/sec)
  Split: split ratio=5:1
  Detector: FID (Flame Ionization Detector)

(3) Evaluation of Izod impact strength: Notched Izod impact strength of the polycarbonate resin is measured on a ⅛" thick specimen in accordance with ASTM D256.

(4) Evaluation of melt flow index: The melt flow index (melt flow rate) of the polycarbonate resin is measured at 300° C. under a load of 1.2 kg in accordance with ASTM D1238.

TABLE 1

|  | Example 1 | Example 2 | Comparative Example 1 |
|---|---|---|---|
| Presence of Extrusion Vent | No | Yes | No |
| Amount of $Cl^-$ ion (ppb) | 1.0 | 0.9 | 2.1 |
| Amount of $F^-$ ion (ppb) | 0.3 | 0.2 | 0.5 |
| Amount of $SO_4^{2-}$ ion (ppb) | 1.9 | 1.8 | 2.4 |
| Detected area (total peak area) of out-gas (Area/g) | $3.37 \times 10^7$ | $2.95 \times 10^7$ | $6.24 \times 10^7$ |
| Number of detected peaks of out-gas | 25 | 23 | 31 |
| Izod impact strength (kgf · cm/cm) | 82 | 83 | 81 |
| Melt flow index (g/10 minutes) | 22 | 21 | 22 |

In Table 1, it can be seen that the container for precision members prepared from the polycarbonate resin of the present invention generates low impurities (ion, out-gas, and the like) and thus has a low possibility of contaminating precision members. Since the present invention employs the polycarbonate resin prepared through simple melt polymerization without adding a specific process, the container for precision members can be prepared economically.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A container for precision members prepared from a polycarbonate resin,
   wherein a solution prepared by immersing the polycarbonate resin in water and leaving the solution has chloride ions ($Cl^-$), fluoride ions ($F^-$) and sulfate ions ($SO_4^{2-}$) in a concentration of about 2 ppb or less, independently of each other, as detected by ion chromatography (IC),
   wherein the concentration of chloride, fluoride and sulfate ions is measured after adding about 35 grams of the polycarbonate resin to about 50 grams of water, maintaining at a temperature of about 50° C. for about 12 hours, and shaking at room temperature for 12 hours, and
   wherein when about 4 g of the polycarbonate resin is heated at 150° C. for about 30 minutes, the polycarbonate resin generates gases, wherein the gases have a detected area (total peak area) of about $3.5 \times 10^7$ Area/g or less as detected by HS-SPME GC/MS.

2. The container for precision members according to claim 1, wherein, when heated, the polycarbonate resin generates gases, the gases providing 25 or fewer detected peaks as detected by head space-solid phase microextraction for gas chromatography/mass spectrometry (HS-SPME GC/MS).

3. The container for precision members according to claim 1, wherein the polycarbonate resin is prepared by melt polymerization of an aromatic dihydroxy compound and a diaryl carbonate.

4. The container for precision members according to claim 1, wherein the aromatic dihydroxy compound is represented by Formula 1:

$$\text{HO-}\underset{(R_1)_a}{\underset{|}{\bigcirc}}\text{-A-}\underset{(R_2)_b}{\underset{|}{\bigcirc}}\text{-OH} \quad (1)$$

where A is a single bond, a substituted or unsubstituted $C_1$ to $C_{30}$ hydrocarbon group, —CO—, —S—, or —$SO_2$—; $R_1$ and $R_2$ are the same or different and are each independently substituted or unsubstituted $C_1$ to $C_{30}$ alkyl or substituted or unsubstituted $C_6$ to $C_{30}$ aryl; and a and b are the same or different and are each independently an integer ranging from 0 to 4.

5. The container for precision members according to claim 1, wherein the diaryl carbonate is represented by Formula 2:

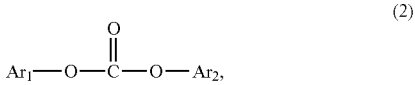

(2)

wherein $Ar_1$ and $Ar_2$ are the same or different and are each independently substituted or unsubstituted $C_6$ to $C_{20}$ aryl.

6. The container for precision members according to claim 1, wherein a mole ratio of the aromatic dihydroxy compound to the diaryl carbonate (aromatic dihydroxy compound: diaryl carbonate) ranges from about 1:about 0.9 to about 1:about 1.3.

7. The container for precision members according to claim 1, wherein the polycarbonate resin has a weight average molecular weight (Mw) from about 20,000 g/mol to about 35,000 g/mol.

8. The container for precision members according to claim 1, wherein the polycarbonate resin has a notched Izod impact strength from about 60 kgf·cm/cm to about 100 kgf·cm/cm, as measured on an about 1/8" thick specimen in accordance with ASTM D256.

9. The container for precision members according to claim 1, wherein the polycarbonate resin has a melt flow index from about 5 g/10 minutes to about 80 g/10 minutes, as measured at about 300° C. under a load of about 1.2 kg in accordance with ASTM D1238.

10. A method for preparing a container for precision members, comprising:
preparing a polymerized material through melt polymerization of an aromatic dihydroxy compound and a diaryl carbonate wherein a solution prepared by immersing the polymerized material in water and leaving the solution has chloride ions (Cl⁻), fluoride ions (F⁻) and sulfate ions ($SO_4^{2-}$) in a concentration of about 2 ppb or less, independently of each other, as detected by ion chromatography (IC),
wherein the concentration of chloride, fluoride and sulfate ions is measured after adding about 35 grams of the polymerized material to about 50 grams of water, maintaining at a temperature of about 50° C. for about 12 hours, and shaking at room temperature for 12 hours, and
wherein when about 4 g of the polymerized material is heated at 150° C. for about 30 minutes, the polymerized material generates gases, wherein the gases have a detected area (total peak area) of about $3.5 \times 10^7$ Area/g or less as detected by HS-SPME GC/MS;
preparing a pelletized extrudate by extruding the polymerized material using an extruder; and
molding the pelletized extrudate to form a container for precision members.

11. The method according to claim 10, wherein the extruder is provided at one end thereof with a vent to perform ventilation during extrusion.

12. The method according to claim 10, wherein the melt polymerization comprises polymerizing the aromatic dihydroxy compound and the diaryl carbonate to prepare a polycarbonate prepolymer; and melt polymerizing the prepared prepolymer to provide a polycarbonate resin.

13. The container for precision members according to claim 1, wherein the solution has chloride ions (Cl⁻), fluoride ions (F⁻) and sulfate ions ($SO_4^{2-}$) in a concentration of about 0.2 ppb to 1.9 ppb, independently of each other, as detected by ion chromatography (IC).

14. The container for precision members according to claim 1, wherein the gases have a detected area (total peak area) of about $3 \times 10^6$ Area/g to about $3.4 \times 10^7$ Area/g as detected by HS-SPME GC/MS.

15. The method according to claim 10, wherein the solution has chloride ions (Cl⁻), fluoride ions (F⁻) and sulfate ions ($SO_4^{2-}$) in a concentration of about 0.2 ppb to 1.9 ppb, independently of each other, as detected by ion chromatography (IC).

16. The method according to claim 10, wherein, when heated, the polymerized material generates gases, the gases providing 25 or fewer detected peaks as detected by head space-solid phase microextraction for gas chromatography/mass spectrometry (HS-SPME GC/MS).

17. The method according to claim 10, wherein the gases have a detected area (total peak area) of about $3 \times 10^6$ Area/g to about $3.4 \times 10^7$ Area/g as detected by HS-SPME GC/MS.

18. The container for precision members according to claim 2, wherein the solution has chloride ions (Cl⁻), fluoride ions (F⁻) and sulfate ions ($SO_4^{2-}$) in a concentration of about 0.2 ppb to 1.9 ppb, independently of each other, as detected by ion chromatography (IC) and wherein the gases have a detected area (total peak area) of about $3 \times 10^6$ Area/g to about $3.4 \times 10^7$ Area/g, as detected by HS-SPME GC/MS.

19. The method according to claim 16, wherein the solution has chloride ions (Cl⁻), fluoride ions (F⁻) and sulfate ions ($SO_4^{2-}$) in a concentration of about 0.2 ppb to 1.9 ppb, independently of each other, as detected by ion chromatography (IC) and wherein the gases have a detected area (total peak area) of about $3 \times 10^6$ Area/g to about $3.4 \times 10^7$ Area/g, as detected by HS-SPME GC/MS.

* * * * *